C. MEDGYES.
APPARATUS FOR CARRYING OUT GASEOUS REACTIONS UNDER HIGH PRESSURE.
APPLICATION FILED SEPT. 26, 1913.
1,295,917.
Patented Mar. 4, 1919.
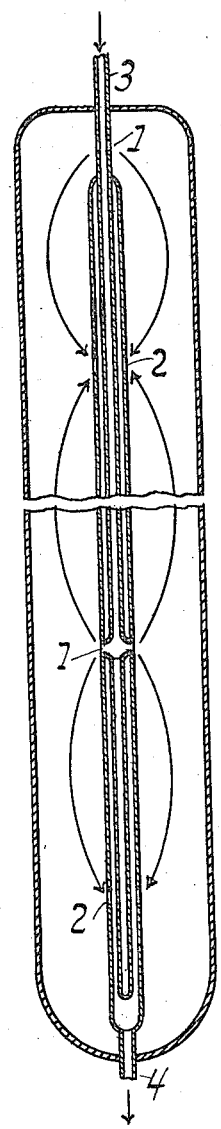
Witnesses:
Inventor
Charles Medgyes
By his Attorneys

UNITED STATES PATENT OFFICE.

CHARLES MEDGYES, OF BUDAPEST, HUNGARY.

APPARATUS FOR CARRYING OUT GASEOUS REACTIONS UNDER HIGH PRESSURE.

1,295,917.

Specification of Letters Patent.

Patented Mar. 4, 1919.

Application filed September 26, 1913. Serial No. 791,947.

*To all whom it may concern:*

Be it known that I, CHARLES MEDGYES, subject of the King of Hungary, residing at Budapest, Hungary, have invented new and useful Improvements in Apparatus for Carrying Out Gaseous Reactions Under High Pressure, of which the following is a specification.

When carrying out gaseous reactions under considerable pressure, either by means of catalytic agents or other exciters, such for instance as actinic rays, either at ordinary or raised temperature, it has been customary to pass the gas through a vessel which is more or less tube-shaped, in such a manner that the gas passes through the whole length in an unbroken current. It is however generally only necessary for the gas to remain for a short time in the reaction space, that is to say in contact with the catalytic agent or under the influence of the actinic rays, and the remaining length of the tube-shaped vessel above that necessary for the reaction to take place is only of use when the velocity of the gas current is increased in order to pass more gas through in unit time. Limits are however very soon reached when it is attempted to increase the velocity of the gases considerably, for the catalytic agent present then offers much more resistance and also when employing actinic rays the yield diminishes; further the maintenance of the temperature offers greater difficulties. Since therefore in practice the yield of a single vessel has limits set to it, is is necessary, in order to deal with large quantities, to employ a number of vessels, and as each vessel has to be provided with the necessary ducts and other appliances for leading the gas to and away, the cost of the plant and its upkeep is enhanced, and further, under the pressure employed, the coefficient of safety is diminished.

I have now discovered that great advantages are obtained when carrying out gaseous reactions under high pressure by dividing the gas in the reaction space of a single vessel into a plurality of currents and passing each current through only one part of the reaction space, so that each of said gas currents goes only a part of the full length of said vessel. This can be done, for instance, as illustrated in the accompanying drawing, representing in longitudinal section an apparatus for carrying out my invention.

In the apparatus shown the gas enters through the tube 3 and passes through the reaction space containing the openings 1, 1 through the catalytic agent as indicated by the arrows, afterward passing away through the openings 2, 2, and leaves the reaction vessel through the tube 4.

It is an essential feature of this apparatus that in at least one instance either an inlet opening or an outlet opening is placed between two openings of the other kind, that is to say either an inlet opening is placed between two outlet openings or vice versa, or two, or more, inlet (outlet) openings can be placed each between two outlet (inlet) openings according to the length of the reaction tube and the number (or velocity) of gas currents desired. In the accompanying drawing, the upper outlet opening 2 is placed between two inlet openings 1, 1 and the inferior inlet opening 1 is between two outlet openings 2, 2, above and below it, respectively.

It will be seen that the quantity of gas in the reaction space is broken up into a plurality of currents each single current passing through the different parts of the reaction space. It is preferred to connect ducts for leading the gas to and from the apparatus with the mechanism for dividing the total gas quantity into the plurality of currents in such a way that the currents in the dividing mechanism travel in the same direction, that is to say, so that the influence of the falls of pressure in each case becomes neutralized. For instance, the tube 3 is connected with the pressure side and the tube 4 with the suction side of the pump. Consequently, in the perforated inlet tube the pressure is greatest at the top and gradually sinks to the other end; on the other hand the pressure in the collecting space is least below and greatest at the top, in consequence the difference of pressures at all points is about the same. As a result of this, each gas current has practically the same velocity.

It will be seen that my invention enables large quantities of gases to be dealt with in a minimum of space and consequently effects a considerable saving in the cost of plant and upkeep.

Now what I claim is:—

1. Apparatus for carrying out gaseous reactions under high pressure, comprising a tube-shaped reaction vessel capable of withstanding high pressure, means for leading gas to and from the reaction vessel, the inlet and outlet openings for the gas being arranged in such manner that at least in one instance one opening of the one kind is placed between two openings of the other kind, so that the gas current is distributed in the vessel into more than one current, each of which goes only a part of the full length of said vessel.

2. Apparatus for carrying out gaseous reactions under high pressure with the aid of catalysts, comprising a tube-shaped reaction vessel capable of withstanding high pressure, said vessel being supplied with a contact mass, means for leading gas to and from the reaction vessel, the inlet and outlet openings for the gas being arranged in such manner that at least in one instance one opening of the one kind is placed between two openings of the other kind, so that the gas current is distributed in the vessel into more than one current, each of which goes only a part of the full length of the contact mass contained in said vessel.

In testimony whereof I have hereunto set my hand in the presence of two subscribing witnesses.

CHARLES MEDGYES.

Witnesses:
 MARCELL HOTTAN,
 MARIE WEISS.